(12) United States Patent
Sättele (10) Patent No.: US 8,521,200 B2
(45) Date of Patent: Aug. 27, 2013

(54) METHOD AND APPARATUS FOR AUTONOMOUS PORT ROLE ASSIGNMENTS IN MASTER-SLAVE NETWORKS

(75) Inventor: Peter Sättele, Biberach (DE)

(73) Assignee: Ubidyne, Inc., Wilmington, DE (US)

( * ) Notice: Subject to any disclaimer, the term of this patent is extended or adjusted under 35 U.S.C. 154(b) by 379 days.

(21) Appl. No.: 12/788,850

(22) Filed: May 27, 2010

(65) Prior Publication Data

US 2010/0291955 A1 Nov. 18, 2010

Related U.S. Application Data (63) Continuation-in-part of application No. PCT/EP2008/066292, filed on Nov. 27, 2008.

(60) Provisional application No. 60/990,740, filed on Nov. 28, 2007.

(30) Foreign Application Priority Data

Nov. 29, 2007 (GB) .................................. 0723366.1

(51) Int. Cl.
*H04W 4/00* (2009.01)
*H04J 3/06* (2006.01)
*H04J 3/16* (2006.01)

(52) U.S. Cl.
USPC ........... 455/507; 370/329; 370/449; 370/503; 370/346

(58) Field of Classification Search
USPC .................. 455/507; 370/329, 449, 503, 346
See application file for complete search history.

(56) References Cited

U.S. PATENT DOCUMENTS

| | | | |
|---|---|---|---|
| 5,918,181 A | 6/1999 | Foster et al. | |
| 6,628,623 B1 | 9/2003 | Noy | |

(Continued)

FOREIGN PATENT DOCUMENTS

| | | |
|---|---|---|
| EP | 1713290 | 10/2006 |
| JP | 2000102056 | 4/2000 |
| WO | 95/33346 | 12/1995 |
| WO | 2006/040653 | 4/2006 |

OTHER PUBLICATIONS

International Search Report dated Apr. 21, 2009 issued in PCT/EP2008/066292.
UK Search Report dated Mar. 13, 2008 issued in GB 0723366.1.

(Continued)

*Primary Examiner* — Bobbak Safaipour
(74) *Attorney, Agent, or Firm* — Stephen H. Eland; Dann, Dorfman, Herrell & Skillman (57) ABSTRACT

The application relates to a method for configuring ports of radio equipments connected to an internal network of a base station of a mobile communications network. The application also relates to the corresponding radio equipment and the corresponding radio equipment controller The method comprises: activating at least one port of the radio equipment to become an activated port, changing the activated at least one port to a non-connected slave state in which the activated at least one port listens to a communication on a link of the internal network for a time period, upon detection of the communication on the link changing the activated at least one port to a connected slave state, or upon expiry of the time period changing the activated at least one port to a non-connected master state in which the activated at least one port actively sends data into the link of the internal network.

16 Claims, 7 Drawing Sheets

(56) References Cited

U.S. PATENT DOCUMENTS

| | | | |
|---|---|---|---|
| 7,295,546 B2* | 11/2007 | Reunam ki | 370/350 |
| 2004/0165576 A1* | 8/2004 | Reunamaki | 370/350 |
| 2004/0185779 A1* | 9/2004 | Boetzel et al. | 455/41.3 |
| 2004/0214527 A1* | 10/2004 | Lim et al. | 455/41.2 |
| 2004/0264372 A1* | 12/2004 | Huang | 370/230 |
| 2005/0144248 A1* | 6/2005 | Doganowski et al. | 709/208 |
| 2005/0169201 A1* | 8/2005 | Huylebroeck | 370/311 |
| 2006/0019678 A1* | 1/2006 | Itoh et al. | 455/456.4 |
| 2006/0116075 A1* | 6/2006 | Gallo | 455/41.2 |
| 2010/0291955 A1* | 11/2010 | Sattele | 455/507 |
| 2011/0032882 A1* | 2/2011 | Zechlin et al. | 370/329 |

OTHER PUBLICATIONS

CPRI Specification V3.0 (Oct. 20, 2006)—Common Public Radio Interface (CPRI); Interface Specification, 89 pages.

* cited by examiner

METHOD AND APPARATUS FOR AUTONOMOUS PORT ROLE ASSIGNMENTS IN MASTER-SLAVE NETWORKS

CROSS REFERENCE TO OTHER APPLICATIONS

This application is a continuation-in-part of International Application No. PCT/EP2008/066292, filed on Nov. 27, 2008, which claims benefit of and priority to U.S. Provisional Application No. 60/990,740, filed Nov. 28, 2007, and which also claims benefit of and priority to United Kingdom Patent Application GB0723366.1, filed on Nov. 29, 2007. The entire contents of each of the foregoing applications are incorporated herein by reference.

FIELD OF THE INVENTION

The present application relates to radio equipment that is usable in a base station of a mobile communications network. The present application also relates to a radio equipment controller that is usable in a base station of a mobile communications network. Furthermore, the present application relates to a method for configuring ports of radio equipments and radio equipment controllers. The present application also relates to a computer-program product usable for the manufacture of the radio equipment and/or radio equipment controller and to a computer-program product usable for carrying out method.

BACKGROUND OF THE INVENTION

Radio base stations are used in mobile communications technology to establish radio communication links between a mobile station, such as a mobile phone or the like, and a communications network in order to transfer communications data into telephony or other communications networks and vice versa.

A radio base station comprises two basic building blocks, the so-called radio equipment controller (REC) and the radio equipment (RE) itself. This decomposition provides deployment flexibility for the mobile network operators. The decomposition requires the definition of the interfaces between the radio equipment and the radio equipment controller. The CPRI (Common Public Radio Interface) specification is one example of such an interface definition. Depending on the used communications standard, the interface between the radio equipment and the radio equipment controller supports different data formats. For example, the functional split between the radio equipment and the radio equipment controller may be done in such a way that a generic interface based on In-Phase and Quadrature (IQ) data can be defined. For the UMTS radio access network, the REC provides access to the Radio Network Controller via the Iub interface, whereas the RE serves as the air interface, called the Uu interface, to the user equipment. For WiMAX, the REC provides access to network entities (e.g. other BS (base stations), ASN-GW (Access Service Network Gateways)), whereas the radio equipment serves as the air interface to the subscriber station/mobile subscriber station (SS/MSS). A more detailed description of the functional split between both parts of a radio base station system is provided in the CPRI Specification V3.0. The CPRI specification should be considered as an example, only. The document WO 2006/040653 A1 describes further aspects of the communication between a radio equipment control node and multiple remote radio equipment nodes. The teachings disclosed herein could be combined or integrated with other specifications that describe master/slave-type links or networks.

A bidirectional interface between two directly connected ports, either between REC and RE, or between two REs, is called a "link". In the CPRI specification, a link uses one transmission line per direction. A working link consists of a master port, a bidirectional cable, and a slave port. Therefore, the link is asymmetrical. The distinction between master port and slave port is important for synchronization, control and management (C&M) channel negotiation during start-up sequence, reset indication, and the start-up sequence. A port in master role is in charge to initiate and control the link setup procedure to the attached slave port. A port in slave role has to reply to incoming master setup attempts, but shall not initiate any connection setup.

The CPRI specification mentions some further conditions. For example, the ports of the REC are always master ports. At least one port of an RE should be a slave port. Optionally, an RE may have additional slave or master ports. The CPRI specification does not consider master/master and slave/slave links.

As to the direction of data flow, the term "downlink" describes the direction from REC to RE, or from master to slave for a link. The term "uplink" describes the opposite directions.

During the initialization phase of the internal network of a radio base station, the mentioned constraints need to be observed. At the same time every radio equipment (RE) needs to be connected to at least one radio equipment controller (REC) in order to be functional. A known approach for the network initialization procedure is to proceed step by step, starting at the REC. The master/slave roles of the ports of the radio equipments in the network are set centrally by the REC using dedicated control commands. The REC holds a preconfigured network topology map which contains the role settings for each individual node in the network.

A precondition for this network initialization procedure is that the REC has a database which contains a logical map of the network attached to it. This map must not have any deviations to the actual physical topology of the network.

In detail, the following actions are performed during the known network initialization procedure according to the CPRI specification:

All REs start up with all CPRI ports in slave mode.
The REC sets one port to master mode and starts establishing a connection to the first RE in the network. Any redundant ports remain silent.
Higher layer protocols for operations and maintenance (O&M) data are established between the REC and the RE.
The REC assigns master role to RE ports according to preconfigured REC internal map via O&M commands.
The newly assigned RE master ports establish links to slave ports of succeeding REs. In a similar manner as described above, higher layer protocols for O&M data are established between the first RE and the subsequent RE and the REC configures the subsequent RE according to the preconfigured REC internal map via O&M commands.

A complete network initialisation requires a certain amount of time, especially for large networks. One reason is that radio equipments that are far away (in terms of network topology) from the radio equipment controller depend on an accomplished configuration of the intermediary radio equipments. Another reason is that higher layer protocols are needed for the configuration of the radio equipments.

When a link loss occurs, the affected RE sets all ports to slave role, which in turn causes link loss and same action for all subsequent REs. The REC has to detect this situation and start to reconfigure the affected part of the network, starting with the last reachable node in the topology.

A mismatch between the topology map on the REC and the actual topology compromises the whole CPRI network, since no traffic (control data as well as payload data) can be routed beyond the point of mismatch.

SUMMARY OF THE INVENTION

According to the teachings disclosed herein there is provided a radio equipment (RE) that is usable in a base station of a mobile communications network. The radio equipment comprises at least two ports for interfacing with an internal network of the base station. Each of the at least two ports is dynamically configurable as a master port or a slave port. Upon activation, each of the at least two ports is configured in a non-connected slave state. Each of the configured at least two ports in the non-connected slave state is arranged to listen to communication on the internal network for a time period and to change to a connected slave state upon detection of the communication on the internal network, or to change to a non-connected master state upon expiry of the time period.

A radio equipment according to the teachings disclosed herein provides a self-configuration ability with respect to the roles (master or slave) of its ports. The radio equipment is capable to adapt the roles of its ports in reaction to the behaviour of the remaining network. This is achieved by assigning each port to a non-connected slave state upon activation of the radio equipment. For each port in the non-connected slave state a determination needs to be made, whether the port should switch to a connected state and whether the port should assume the master role or the slave role.

According to the teachings disclosed herein, each port is capable of detecting communication traffic on the physical link to which the port is connected. The communication traffic could be for example handshake data that is emitted by another port that is connected to the same physical link and that is already set up as a master port. The port in the non-connected slave state recognizes the communication as e.g. handshake data and performs subsequent steps in order to finalize the setup of the link. According to the CPRI standard, a master port is in charge of initialization and control of the link setup procedure to attached slave ports. A slave port has to reply to incoming master setup attempts, but shall not initiate any connection setup. The teachings disclosed in this application are intended to be compatible with the CPRI standard and therefore follow the directives defined in the CPRI standard. However, a port of a radio equipment according to the teachings disclosed herein is not fixed to either the master role or the slave role. The port may change its role in an autonomous manner under certain circumstances.

From the initial non-connected slave state a port may switch to the connected slave state, if the port has detected a communication on the internal network indicating that a master port of another radio equipment or a radio equipment controller attempts to establish a link with the contemplated port of the contemplated radio equipment.

Instead of switching to the connected slave state, the contemplated port may run into a timeout when unsuccessfully listening for relevant communication on the internal network. The port is configured to switch to a non-connected master state in this situation. As the port now defines itself as a master port, it is in charge to initiate and control the link setup procedure to possibly attached slave ports.

The teachings disclosed herein circumvent the need for storing the topology of the internal network of the base station and of configuring each port of each radio equipment in accordance with the stored network topology. To a large extent, the information that is required for configuring the ports of the radio equipment can be determined on a local level so that an autonomous port role assignment in master-slave link networks is possible. The circumvention of a topology map also avoids the need to define such a topology map and to modify the topology map when the network was restructured. Current internal networks of base stations typically face the problem that a mismatch between the topology map (stored within a radio equipment controller, for example) and the actual topology compromises the whole CPRI network, since no traffic (control data as well as payload data) can be routed beyond the point of mismatch. With the teachings disclosed herein, "live" insertion/removal (hot plug-in) of radio equipments in a CPRI network without the need to synchronize the radio equipment controller becomes possible. The downtime of the antenna network is reduced in this case, because no time for manually reconfiguring the network is needed anymore. The teachings disclosed herein also avoid the need for direct remote access to the radio equipment controller (which is otherwise needed to immediately adapt the CPRI link topology configuration map).

The teachings disclosed in this application allow to reduce operational expenses due to reduced configuration complexity of the radio equipment controller. With the teachings disclosed herein, there is no need to configure the topology map on CPRI level anymore.

The teachings disclosed herein reduce the fault probability when the base station is being serviced, because it provides an increased resilience against accidental wrong connection of ports at the radio equipment. Otherwise a potential source of mismatch between the topology map in the radio equipment controller and the reality would lead to a network failure. Finding the cause for such a network failure often requires increased effort.

The bootstrap phase of the base station's internal network is also simplified with the teachings of the present application. There is no need for management protocols to be up and running to get a connection on e.g. CPRI level. This simplification of the bootstrap phase leads to an inherently more reliable network.

The ports may be further defined by the following abilities. For example, each of the at least two ports may further be adapted to toggle between the non-connected slave state and the non-connected master state.

Toggling between the non-connected slave state and the non-connected master state means that the port alternates between actively attempting to initiate the link setup procedure (i.e. non-connected master state) and passively listening to communication on the internal network (i.e. non-connected slave state). This behaviour prevents deadlock situations involving two physically connected ports, in which the two ports remain each in the non-connected slave state. Toggling may be time-controlled, which means that the port remains in each of the two non-connected states for a predetermined time, respectively, unless a condition is encountered that causes the port to switch to the connected master state or the connected slave state. The durations for which the port is held in the non-connected master state and the non-connected slave state may be different from each other. For example, it may be contemplated that the port remains longer in the non-connected slave state than in the non-connected master state. The toggling ratio and/or the toggling frequency may vary from one radio equipment to another, again in order to prevent deadlock situations between two ports that switch their state concurrently.

Each of the at least two ports in the non-connected master state may be further arranged to send data into the internal network and to listen to a response to the data sent into the internal network, and to change to a connected master state upon detection of the response. The data sent into the internal network is intended to cause a port at another radio equipment to respond. If the port at the other radio equipment responds and thereby indicates that it accepts to establish the link setup proposed by the master port, then both ports become connected and switch to the respective connected state. In doing so, both ports have agreed upon one of them being the master and the other being the slave. This is achieved by the teachings disclosed herein although none of the ports is preconfigured to be master or slave. The two ports have self-organized the assignment of master role and slave role.

Each of the at least two ports in the connected slave state may be further adapted to detect a link loss condition, to determine whether at least one other of the at least two ports of the radio equipment is in the connected slave state, and to change to the non-connected master state for sending data into the internal network and for listening to a response to the data sent into the internal network, if at least one other of the at least two ports of the radio equipment is in the connected slave state. Link loss conditions may occur during operation of the radio equipment for a variety of reasons. The behaviour of the radio equipment described above defines how the radio equipment should react in order to maintain, on average, as much of its connectivity as possible and to re-establish lost links as quickly as possible. A port that is in the connected slave state should be kept as a slave port, if possible. The reason is that a connected slave port is likely to have the shortest connection or even the only connection to the radio equipment controller among all ports of the radio equipment. Losing the connection to the radio equipment controller should be avoided whenever possible. The reason for slave ports usually having shorter connections to the radio equipment controllers resides in the way the network is initialised. Network initialisation usually begins at the radio network controller, the ports of which are master ports per definition. From the radio network controller the initialisation of the network propagates, which leads to a certain pattern of port role assignment. However, it should be noted that the entire process is self-organized by the radio equipments so that aberrations may occur. When a link loss condition occurs at a connected slave port, yet other slave ports are still connected, then the radio equipment is assumed to be still connected to the radio equipment controller (directly or indirectly). It may then be attempted to reconnect the port at which the link loss occurred as a master. A port that is in the non-connected master state may actively initiate a link setup procedure, whereas a port in the non-connected slave state is bound to wait until its counterpart does so. Again, a deadlock situation may occur, if both ports remain in their respective non-connected slave states, because none of the ports actively initiates a link setup procedure. Such behaviour is prevented by the radio equipment behaviour described above.

Each of the at least two ports in the connected master state may further be adapted to detect a link loss condition, to determine whether a connection can be re-established, and wherein, upon determination that the connection cannot be re-established, the radio equipment changes any port that is presently in the non-connected slave state to the non-connected master state for starting link setup attempts on the ports in the non-connected master state. A port in the master state having undergone a link loss condition first verifies whether the link loss condition was only temporary, caused for example by a temporary power failure of the other radio equipment. After the link loss condition has persisted for a certain time, or a number of re-establishment attempts have been undertaken, it has to be assumed that successful re-establishment of the connection becomes less and less probable. Therefore the strategy is changed and the radio equipment starts using other ports for its attempts to re-establish connections. Ports that are in the non-connected slave state are good candidates for such attempts, because no connection needs to be deliberately interrupted. The ports in the non-connected slave state are switched to the non-connected master state and start link setup procedures.

Each of the at least two ports may further be configurable to a master state or a slave state using commands. The corresponding commands, i.e. the port role assignment commands, may be issued by a central entity within the internal network of the base station, such as a radio equipment controller. The central entity may use a pre-stored topology map of the internal network for assigning a port role to a specific port. Alternatively, the central entity could try to explore the internal network and built a topology map on its own. This is possible, because the self-organization of the radio equipments has already taken care of basic connectivity so that each radio equipment is normally accessible from the central entity. The central entity for port role assignment may try to organize the network in a particular manner and to improve for example the desired redundancy of the internal network. This organisation and optimization of the internal network may be achieved by defining rules and guidelines for the port role assignment of the central entity. The provision of the ports being configurable by commands allows a two-stage initialization process: During a first stage, a preliminary configuration of the radio equipments and their ports is performed. This preliminary configuration typically provides a basic connectivity to all the radio equipments, but may not be optimal with respect to e.g. redundancy or regularity of the network. The second stage, which is command-controlled, corrects and optimizes the network configuration and in particular the port role assignment. This may be necessary for higher level applications programs, which may rely on a particular pattern of master ports and slave ports.

Besides a radio equipment (RE), the teachings disclosed herein also relate to a radio equipment controller (REC) usable in a base station of a mobile network. The radio equipment controller comprises at least a first port and a second port for interfacing with an internal network of the base station. The first port is configured in a non-connected master state upon activation of the first port and is adapted to actively send data into the internal network. The second port is configured to be in a wait state upon activation of the second port. The second port is also arranged to detect attempts for link setup of a radio equipment physically connected to the second port and to change to the non-connected master state for actively sending data in the internal network.

In yet a further aspect a computer program product is proposed that is embodied on a computer readable medium and comprises executable instructions for the manufacture of the above mentioned radio equipment and/or radio equipment controller.

A radio equipment controller that is configured in the described manner is well suited to be used in an internal network having ring redundancy. The second port waits until the configuration of the ring is almost completed. The second port of the radio equipment controller is capable of detecting whether the last radio equipment of the ring has configured itself to the non-connected master state. This detection can be based on a certain pattern of activity of the last radio equipment. For example, the last radio equipment might begin to send e.g. handshake data towards the radio equipment controller which would be interpreted as an attempt for link setup by the radio equipment controller. In this case, the radio equipment controller would wait until the last radio equipment toggles back to the non-connected slave mode and ceases to send handshake data. The radio equipment controller then starts to send e.g. handshake data on its own.

The teachings disclosed herein also relate to a method for configuring ports of radio equipments connected to an internal network of a base station of a mobile communications network. The method comprises activating at least one port of the radio equipment to become an activated port and changing the activated at least one port to a non-connected slave state in which the activated at least one port listens to a communication on a link of the internal network for a time period. Upon detection of the communication on the link the activated at least one port is changed to a connected slave state. Upon expiry of the time period the activated at least one port is changed to a non-connected master state in which the activated at least one port actively sends data into the link of the internal network.

The method according to what is taught herein provides a self-configuration ability for radio equipments with respect to the roles (master or slave) of the radio equipment's ports. The method adapts the roles of the ports at least partially in reaction to the behaviour of the remaining network. This is achieved by assigning each port to a non-connected slave state upon activation of the radio equipment. For each port in the non-connected slave state a determination needs to be made, whether the port should switch to a connected state and whether the port should assume the master role or the slave role.

The method may further comprise toggling the state of the activated at least one port between the non-connected slave state and the non-connected master state until either the communication on the link or a response to data sent into the link is detected. According to the method taugt and disclosed herein, there is no predefinition of a port with respect to its master role or slave role as long as the port is in a non-connected state. Toggling ensures that a port is capable of connecting either as a master or a slave, depending on which role best suits the port's situation within the network.

The method may further provide that each one of the at least one port being in the non-connected master state listens for a response to the data sent into the internal network, and changes to a connected master state upon detection of the response. The detection of the response is an indicator for the port that the corresponding port is present and has acknowledged the link setup attempts of the first port.

The method may further comprise for each one of the at least one port that is currently in the connected slave state: detecting a link loss condition, determining whether at least one other of the at least one port of the radio equipment is in the connected slave state, and if at least one other of the at least one port of the radio equipment is in the connected slave state, then changing to the non-connected master state for sending data into the internal network and for listening to a response to the data sent into the internal network. This means that a connected slave port that has detected a link loss condition checks the status of the other port(s). If there is still at least one connected slave port left, it is assumed that the radio equipment is still (directly or indirectly) connected to the radio equipment controller, i.e. a basic functionality of the radio equipment is maintained via the connected slave port. Nevertheless, the radio equipment attempts to reconnect the port that is affected by the link loss. As described above, the port that is affected by the link loss is switched to the non-connected master state. As a non-connected master, the port affected by the link loss begins to send data into the corresponding link of the internal network. The port at the other end of the link might now be in the non-connected slave state and therefore respond to the data sent into the link. The response is detected by the port of the first radio equipment and the link can be re-established. Compared to the initial port role assignment, the port of the first radio equipment and the port of the second radio equipment have swapped their respective roles.

The method may further comprise configuring one of the at least one port to a master state or a slave state using commands. Reference is made to above remarks about the corresponding provision of the radio equipment according to what is taught herein.

The teachings of the present application also relate to a method for configuring ports of a radio equipment controller (REC) connected to an internal network of a base station of a mobile communications network. The method comprises:

activating a first port of the radio equipment controller, configuring the first port to be in a non-connected master state, and the first port actively sending data into a corresponding link of the internal network, activating a second port of the radio equipment controller, configuring the second port to be in a wait state for a wait time, upon expiry of the wait time the second port listing to communication on a second link to a radio equipment, upon detection of the communication on the second link changing the state of the second port to the non-connected master state and the second port actively sending data into the internal network.

This method for a radio equipment controller REC cooperates with the method for a radio equipment RE, especially when a ring redundancy is employed for the internal network. In particular, the method avoids race conditions between two master ports of the radio equipment controller REC. One of the ports of the radio equipment controller is designated to be the first or primary port. The configuration of the internal network begins at this primary port, propagates through the ring topology of the internal network, and eventually ends at the second port of the radio equipment controller. The second port of the radio equipment recognizes when a port of a radio equipment attempts to establish a link wherein the port of the radio equipment RE would be configured as master and the port of the radio equipment controller REC would be configured as slave. In order to avoid such constellation, the second port of the radio equipment controller REC does not respond to the invitation of the radio equipment's port, but in turn initiates the link setup procedure on its own, as soon as the radio equipment's port toggles to the non-connected slave mode.

The method for configuring the ports of a radio equipment controller may further comprise:
receiving status information from the ports of one or more radio equipments, and sending port configuration commands to the one or more radio equipments. The actions of receiving status information and sending port configuration commands could be performed during a later stage of a network initialisation process having multiple stages. Receiving status information and sending port configuration commands require at least a basic connectivity between the radio equipments and the radio equipment controller. This basic connectivity is achieved by the first stage(s) of the network initialisation procedure which is based on the principle of autonomous port configuration as described in this application.

In a further aspect, a computer program product is proposed that comprises instructions that enable a processor to carry out the method described above.

DESCRIPTION OF THE DRAWINGS

The context of the teachings disclosed herein may be better understood when reading the detailed description and the figures, wherein identical reference signs identify identical or similar objects and wherein.

DETAILED DESCRIPTION OF THE DRAWINGS

Figure 1:
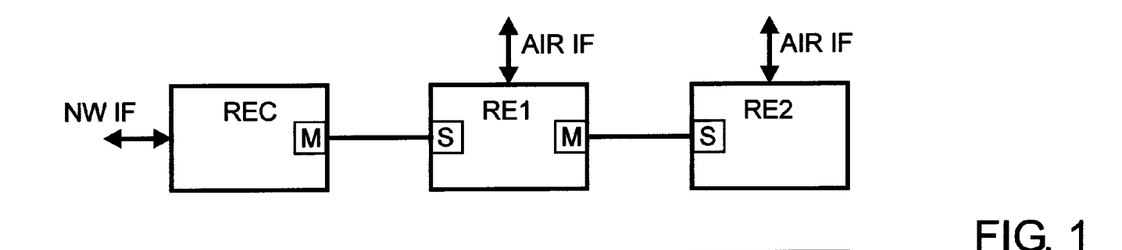
FIG. 1 shows an internal network of a radio base station having a chain topology.

FIG. 1 shows an internal network of a radio base station. The internal network has a chain topology and comprises a radio equipment controller REC, a first radio equipment RE1 and a second radio equipment RE2. The radio equipment controller REC handles the Network Interface transport via a network interface NW IF. Further tasks of the radio equipment controller REC are control and management of the radio base station and digital baseband processing.

The radio equipment controller REC has a port that is configured as a master port M. A link to a radio equipment RE1 begins at the master port M of the radio equipment controller REC and ends at a slave port S of the radio equipment RE1. The chain continues to a second radio equipment RE2 via a link from a master port M of the first radio equipment RE1 to a slave port S of the second radio equipment RE2.

According to the CPRI specification the tasks of the radio equipments RE1 and RE2 are analogue and radio frequency functions, such as filtering, modulation, frequency conversion and amplification. The radio equipments each comprise an air interface AIR IF to which an antenna element can be connected.

Figure 2:
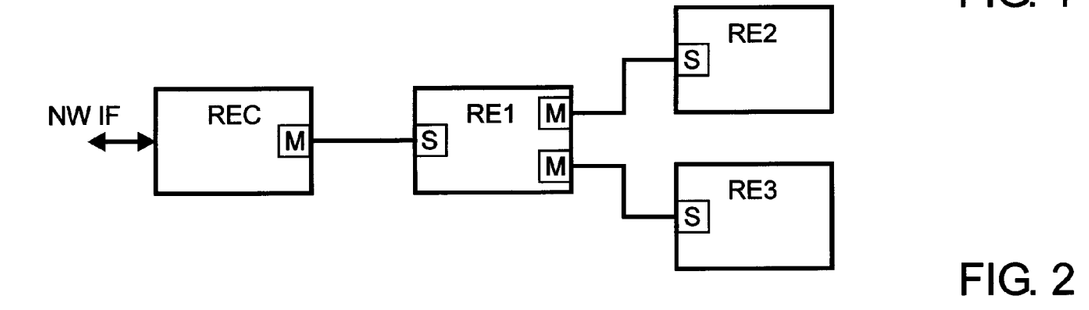
FIG. 2 shows an internal network of a radio base station having a tree topology.

FIG. 2 shows another configuration of an internal network of the radio base station, in which the network has a tree topology. In addition to the chain topology shown in FIG. 1, the internal network shown in FIG. 2 comprises a third radio equipment RE3 that is connected to a second master port M of the first radio equipment RE1.

Figure 3:
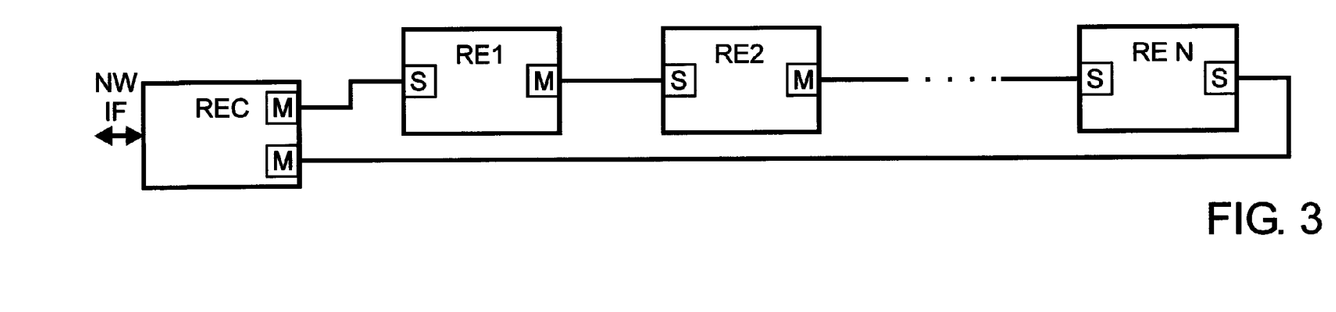
FIG. 3 shows an internal network of a radio base station having a ring topology.

FIG. 3 shows a third configuration of an internal network of the radio base station, in which the network has a ring topology. The ring is formed by the radio equipment controller REC and N radio equipments RE1, RE2 to RE N. The upper branch of the ring is similar to the chain topology network of FIG. 1. In order to add redundancy to the internal network, the chain structure is completed by a link from a slave port S of the last radio equipment RE N back to a second master port M of the radio equipment controller.

FIGS. 1 to 3 show basic network topologies which may be combined to form larger and more complex network topologies, which is expected to become of interest for upcoming radio base station concepts.

Figure 4:
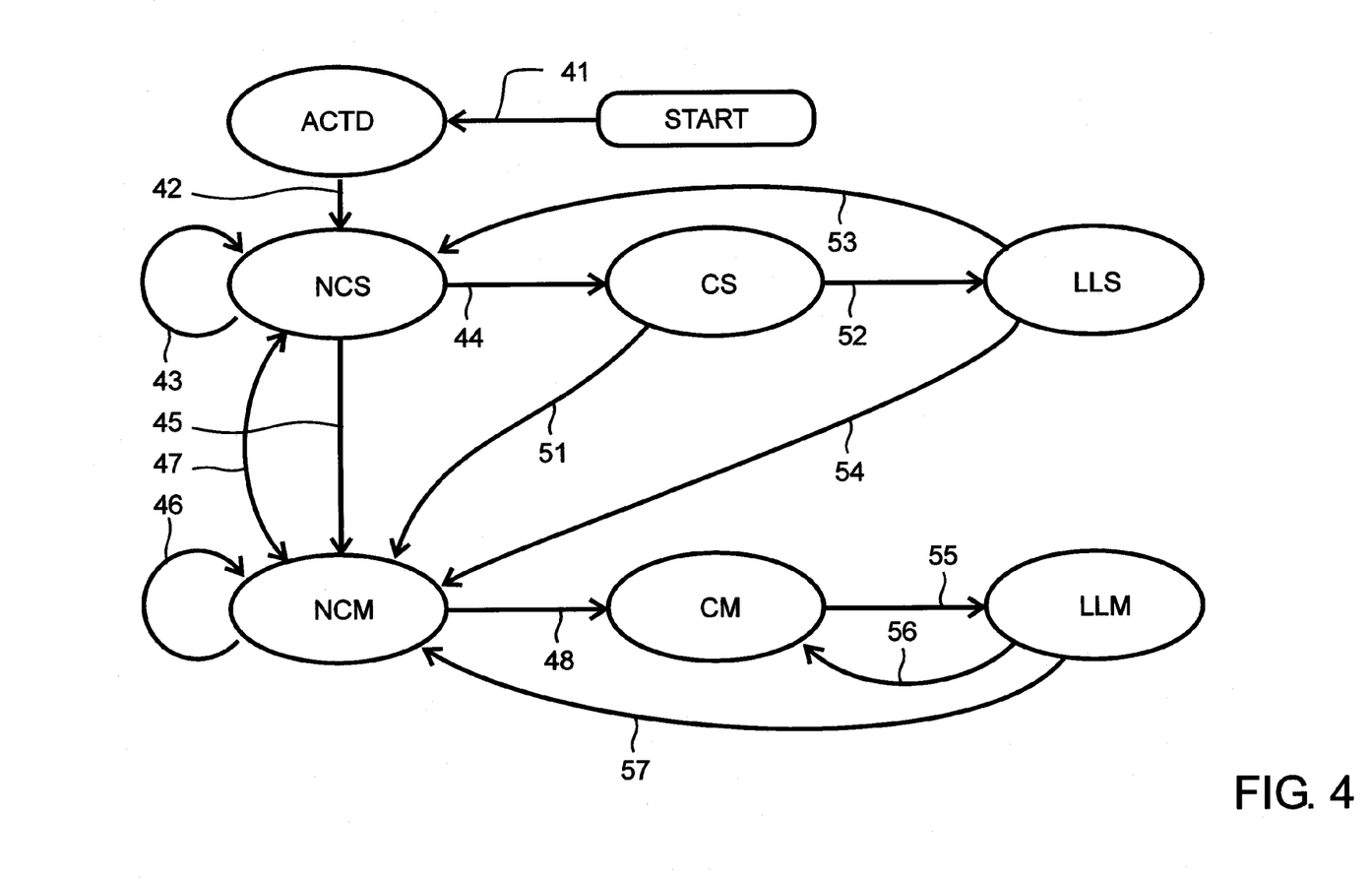
FIG. 4 shows a state diagram for a port of a radio equipment RE.

FIG. 4 shows a state diagram for a port of a radio equipment RE. When the radio equipment RE is powered up in transition 41, the port switches to a state "Activated" ACTD. An unconditional transition 42 changes the port's state from "Activated" ACTD to the non-connected slave state NCS. In a circular transition 43 from and to the non-connected slave state NCS, the port tries to detect communication on the link by listening to any data that is transmitted by a remote port at the other end of the link. When the port detects appropriate communication sent from the remote port (transition 44) the state of the port switches to the connected slave state CS. Appropriate communication means that the remote port has sent data that is suitable for setting up a link between the remote port and the contemplated port. The contemplated port is now operable.

The contemplated port attempts to detect appropriate communication during a predetermined time period. After this time period, the port's state is switched via transition 45 to a non-connected master state NCM. In the non-connected master state, the port sends out link setup data and listens for a response from the remote port via circular transition 46.

A transition 47 designates a toggling behaviour of the contemplated port between the non-connected slave state NCS and the non-connected master state NCM. The port periodically switches its state between the two non-connected states NCS and NCM until either the connected slave state CS or a connected master state CM is reached. Toggling may be asymmetrical, i.e. the port stays longer in the non-connected slave NCS state than in the non-connected master state NCM, or vice versa.

The non-connected master state NCM may also be left via transition 48 to the connected master state CM. The condition that must be met for entering the connected master state is that the port has received a response to its setup initiation data from a remote port. Accordingly, the remote port has accepted the slave role.

During normal operation, the port remains in either the connected slave state or the connected master state. However, due to various reasons a link loss condition may occur. For example, a maintenance technician may disconnect the physical connection between two ports in order to replace or add components to the internal network of the radio base station. Another reason could be damage to the cable. In fact, modern radio base stations may be wide spread and comprise long cables between their components, which increases the probability that the cable might be damaged by e.g. construction works or environmental conditions.

A port that is currently in the connected slave state CS and detects a link loss condition switches to the link loss slave state LLS via transition 52. Similarly, a port that is currently in the connected master state CM and detects a link loss condition switches to the link loss master state LLM via transition 55.

Turning first to the link loss slave state LLS, the following strategy is proposed for reconnecting the port as quickly as possible. As mentioned above, CPRI requires that each radio equipment RE should have one connected slave port. Therefore it is checked, whether there is still one port in the connected slave state CS. If this is the case, the port in the link loss slave state LLS switches its state to the non-connected master state NCM via transition 54 in order to check whether the link can be re-established in this manner. If there is no port left that is in the connected slave state CS, then all ports are disconnected and their states are switched to the non-connected slave state NCS via transition 53, respectively. This is done in order to increase the chance that at least one of the ports can re-establish a connection as a slave port.

A link loss at a master port causes the affected master port to stay in the master role and to retry a reestablishment of the link. Sometime the link loss condition does not prevail for a long time, for example if it was caused by a temporary power failure of a component. When the reestablishment of the link is successful, the state of the port switches back to the connected master state CS via transition 56. In order prevent that the port is blocked in the link loss master state LLM when reestablishment is not possible, the port's state is switched to the non-connected master state NCM via transition 57 after the port has tried to re-establish the link for some predetermined time or after a certain number of unsuccessful attempts. From the non-connected master state NCM, the port periodically toggles to the non-connected slave state NCM in order to check whether a reestablishment of the link as a slave port is possible.

Figure 5:
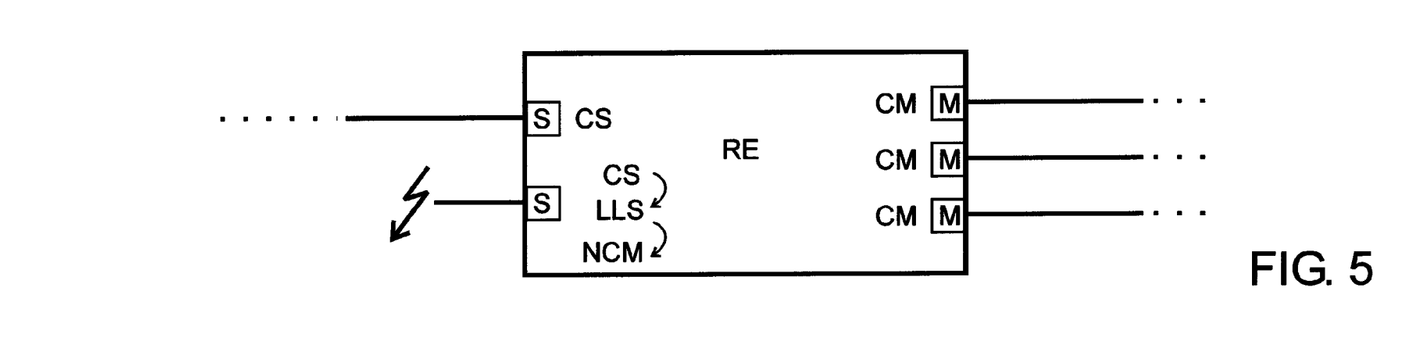
FIG. 5 shows radio equipment with several master ports and several slave ports, wherein one of the slave ports is in a link loss condition.

FIG. 5 shows a radio equipment with several master ports and several slave ports. During normal operation the master ports are in the connected master state CM and the slave ports are in the connected slave state CS, which is also indicated in FIG. 5. When a link loss condition occurs at the lower left port, the state of the lower left port switches from the connected slave state CS to the link loss slave state LLS. The radio equipment checks whether there is still another port in the connected slave state CS. Since in the depicted case the upper slave port is still in the connected slave state, the lower left port is switched to the non-connected master state NCM. Starting from the non-connected master state NCM, the lower left port attempt to establish a link with its corresponding port as a master port.

Figure 6:
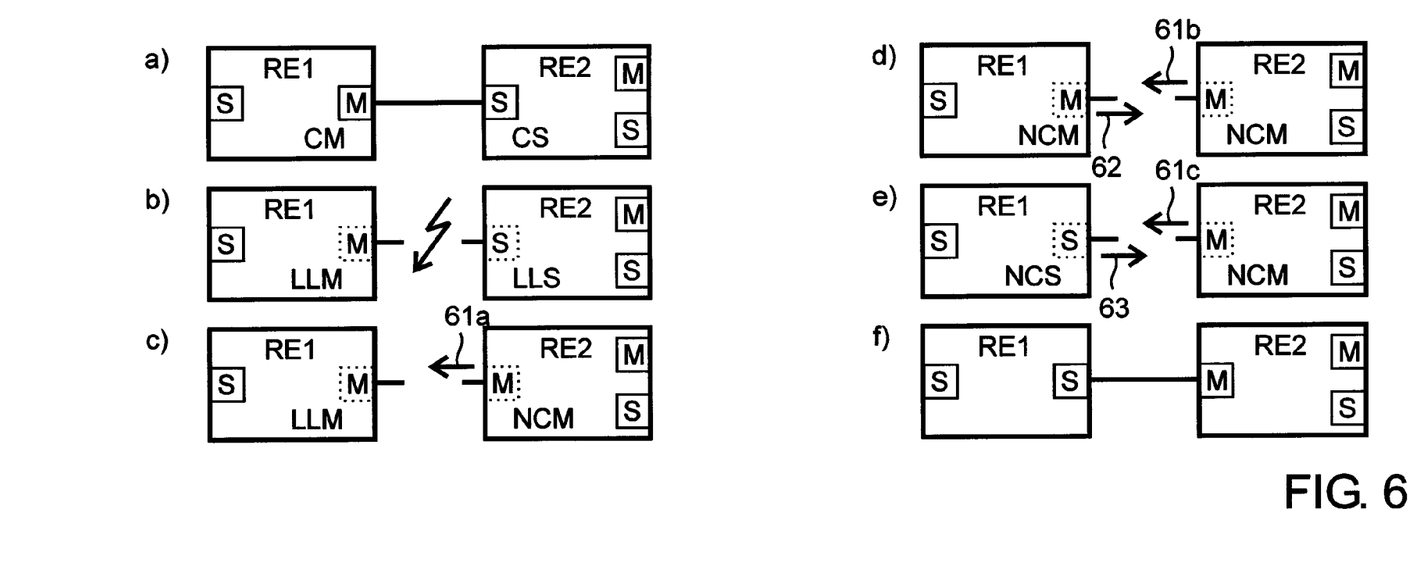
FIG. 6 shows two radio equipments during different stages of a mutual link loss condition.

FIG. 6 shows two radio equipments during different stages of a mutual link loss condition and the reestablishment of the link. Stage a) represents normal operation of the two radio equipments and their respective ports. Radio equipment RE1 has a port in connected master state CM that communicates with one of two ports in connected slave state CS of radio equipment RE2. When a link loss condition occurs between the two mentioned ports, the port of radio equipment RE1 switches to the link loss master state LLM and the port of radio equipment RE2 switches to the link loss slave state LLS, shown in stage b). Since radio equipment RE2 still has another operative port in connected slave state CS, the port with the link loss condition switches to the non-connected master state NCM and actively sends link setup data to its corresponding port, which is indicated by arrow 61a in stage c). The corresponding port of radio equipment RE1 is in the link loss master state LLM and therefore does not respond to the link setup data sent by radio equipment RE2. Eventually, also the affected port of radio equipment RE1 switches to the non-connected master state NCM (stage d) which leads to radio equipment RE1 sending link setup data (arrow 62) and radio equipment RE2 sending link setup data (arrow 61b). This constellation with two competing master ports does not lead to the establishment of a working link. Since a port toggles between the non-connected master state NCM and the non-connected slave state NCS, one of the ports will switch to the non-connected slave state NCS after same time. In the depicted case, the port of radio equipment RE1 switches to the non-connected slave state NCS. The next time when the port of radio equipment RE2 sends link setup data 61c in stage e), the port of radio equipment RE1 can respond by sending a response 63. In stage f) the radio equipments RE1 and RE2 are connected again by means of their respective ports. However, the role assignment has changed, because now the former master port is in the connected slave state CS and the former slave port is in the connected master state.

Figure 7A:
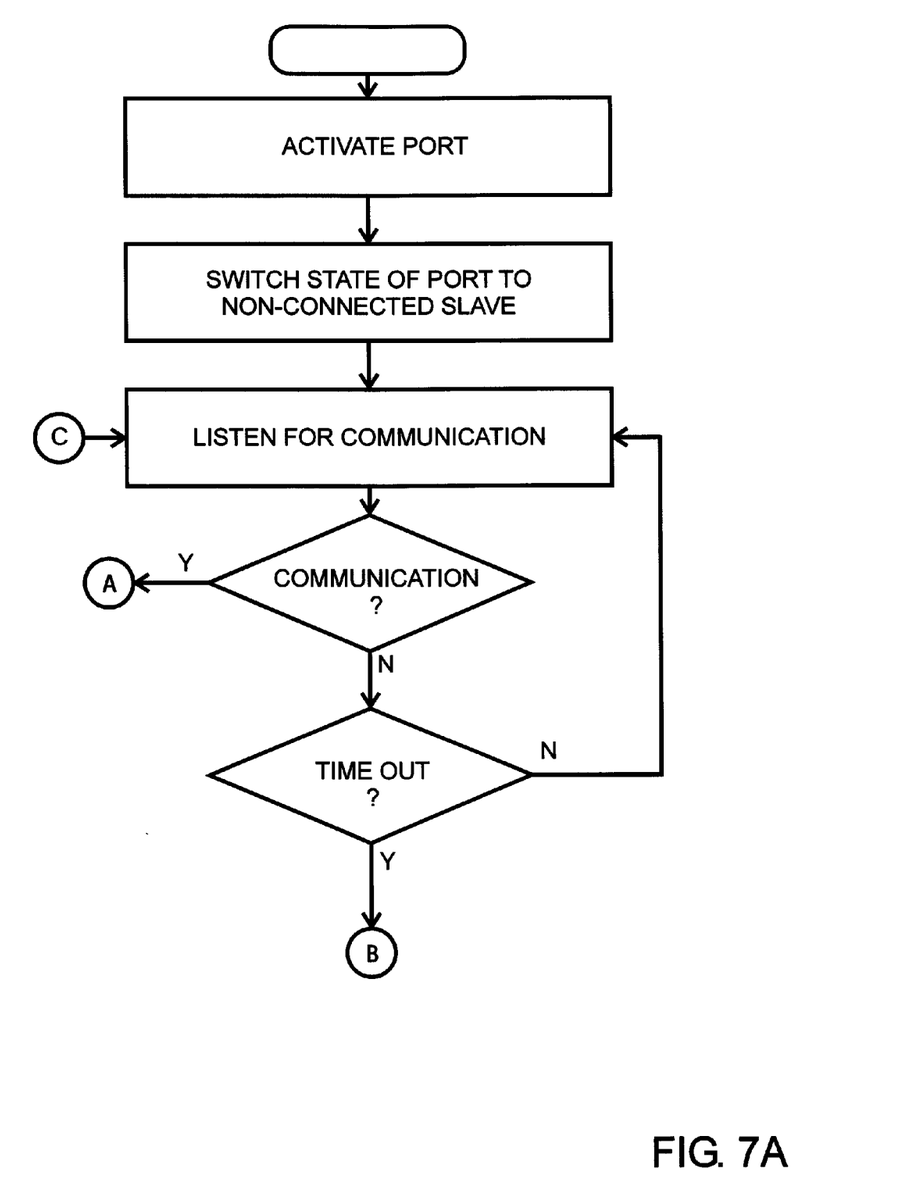
FIGS. 7A to 7D show a flowchart of a method for configuring ports of a radio equipment RE.
Figure 7B:
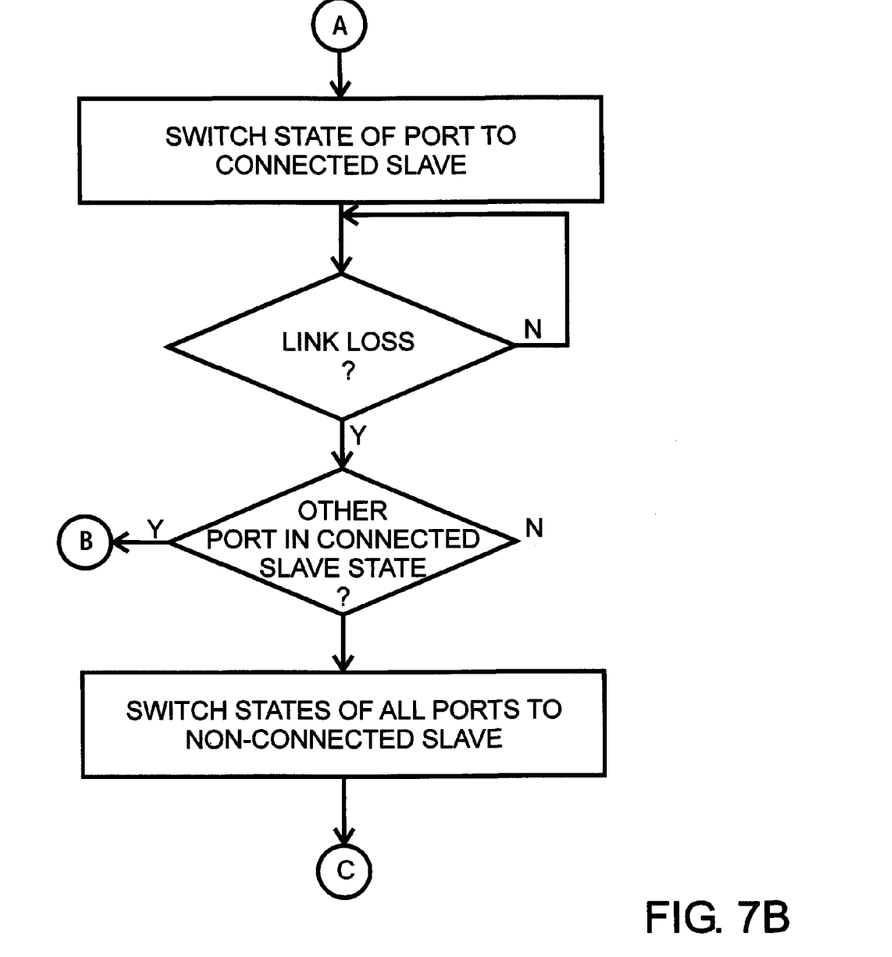
Figure 7C:
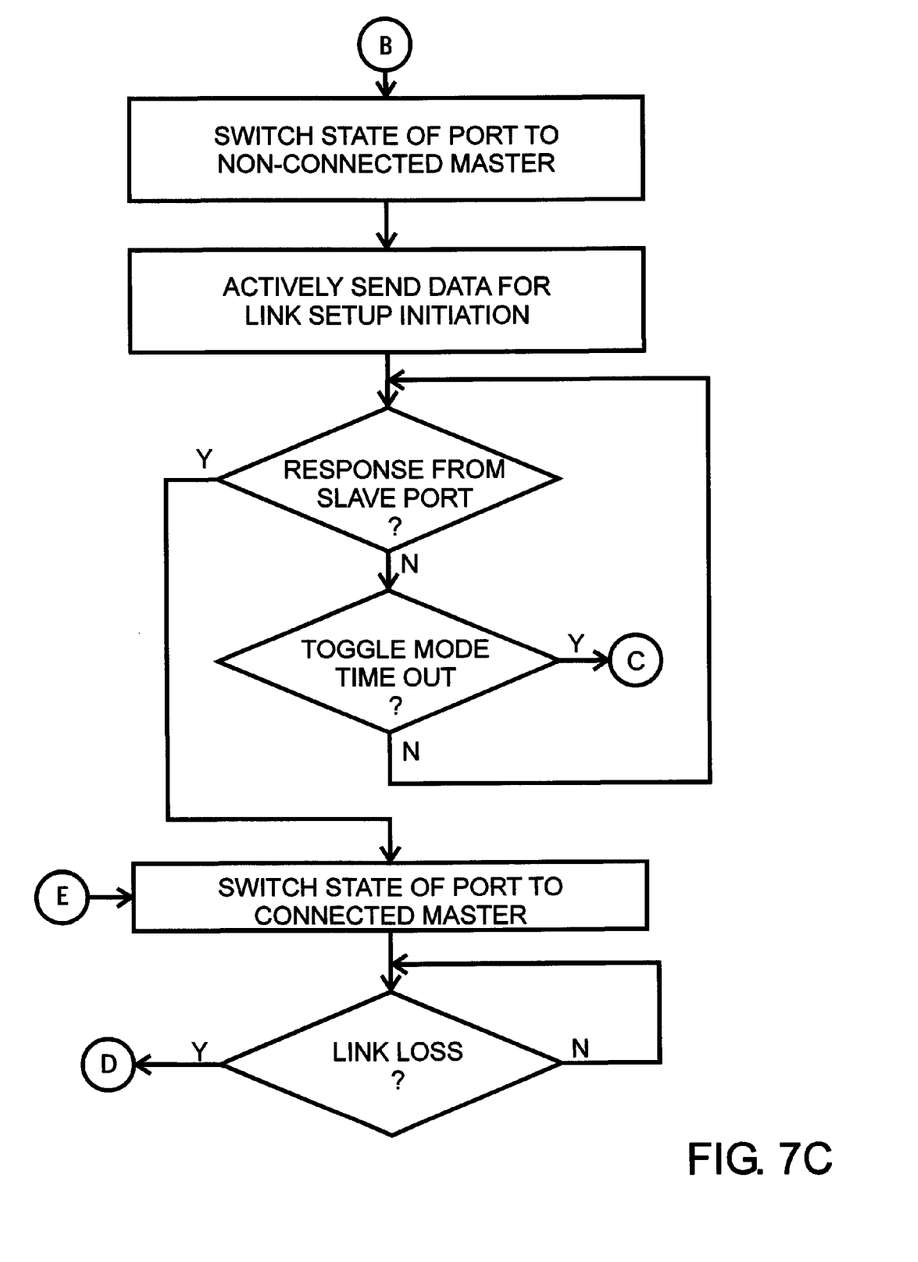

FIGS. 7A to 7D show a flowchart of the method according to what is taught herein. For the sake of simplicity, only the initialisation phase and the link loss behaviour of the ports is shown. In FIG. 7A the method starts with activating the port(s). The state of the port is then switched to the non-connected slave state. The port in the non-connected slave state listens for communication from its corresponding port. If the port is able to detect a communication from the other port, the method proceeds at point A (FIG. 7B) of the flowchart. In the alternative, if a link setup communication from the other port could not be detected it is checked whether the port has been long enough in the non-connected slave state NCS by evaluating a time out condition. If this is not the case, the procedure returns to the listening step. If the time out condition is true, the procedure continues at point B (FIG. 7C).

FIG. 7B shows a part of the procedure starting at point A. The state of the port in question is switched to the connected slave state CS. During normal operation of the port, it is continuously checked, whether a link loss condition is true. If yes, it is checked, whether there is at least one other port left at the radio equipment in question, that still is in the connected slave mode. If yes, the procedure continues at point B. If there is no other connected slave port left, the radio equipment sets all ports back to the non-connected slave mode and the procedure continues at point C in FIG. 7A for all ports.

FIG. 7C shows a part of the procedure that starts at point B. Since previous attempts to connect the port as a slave were not successful, the state of the port is now switched to the non-connected master state. Accordingly, the port starts to actively send data for link setup initiation to the corresponding port. The port then listens for a response from the corresponding port, which needs to be in the non-connected slave state NCS in order to send a response. When the master port does not detect a response, it first checks whether a time out has occurred that limits the maximum duration for which a port remains in the non-connected master state. As mentioned earlier, the state of a port toggles between non-connected slave state NCS and non-connected master state NCM until the port gets connected either as slave or as master. For this reason, the time out is called the "toggle mode time out" in FIG. 7C.

When the port in the non-connected master state NCM detects a response from its associated slave port, the state of the master port is switched to the connected master state CM. The port now operates as a master port and periodically checks for a link loss condition. If the port detects a link loss condition, the procedure continues at point D (FIG. 7D).

Figure 7D:
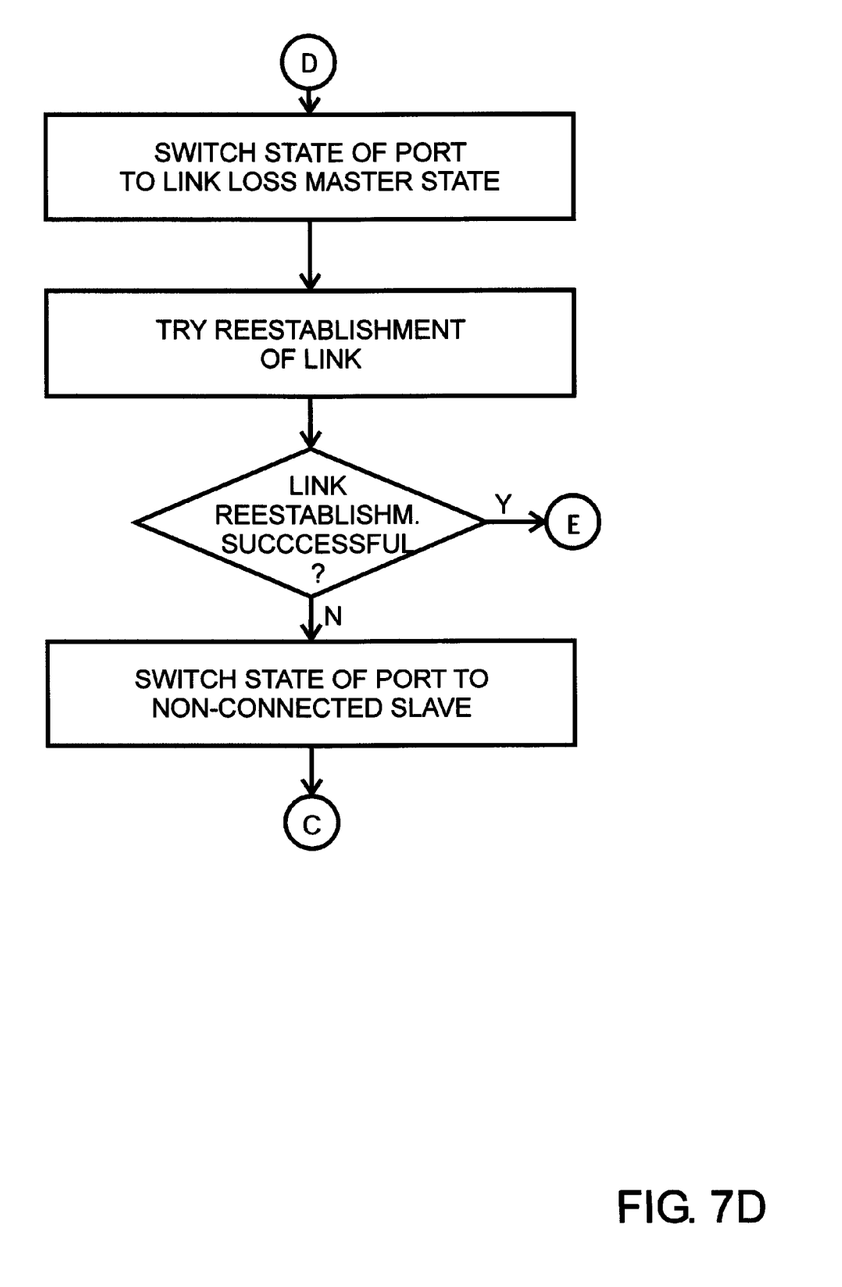

FIG. 7D shows the part of the procedure that starts at point D. The state of the port that has detected a link loss condition is switched to the link loss master state LLM. The port tries to re-establish the link for a certain time. When the link reestablishment was successful, the port switches back to the connected master state at point E of the procedure. If the reestablishment of the link was not successful, the state of the port is switched to the non-connected slave state LLS and the procedure continues at point C of the flow chart.

It should be understood that the foregoing relates to exemplary embodiments of the teachings disclosed herein and that modifications may be made without departing from the spirit and scope of protection as set forth in the following claims.

While various embodiments of what is taught have been described above, it should be understood that they have been presented by way of example, and not limitation. It will be apparent to persons skilled in the relevant arts that various changes in form and detail can be made therein without departing from the scope of what is taught. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the disclosed apparatus, method or computer-program product may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the disclosed apparatus, method or computer-program product should not be limited by any of the above-described exemplary embodiments, but should be defined only in accordance with the following claims and their equivalents.

The invention claimed is:

1. A radio equipment usable in a base station of a mobile communications network, the radio equipment comprising at least two ports for interfacing with an internal network of the base station, each of the at least two ports being dynamically configurable as a master port or a slave port, wherein each of the at least two ports is configured in a non-connected slave state upon activation, each of the configured at least two ports in non-connected slave state being arranged to listen to communication on the internal network for a time period and to change to a connected slave state upon detection of the communication on the internal network, or to change to a non-connected master state upon expiry of the time period.

2. The radio equipment according to claim 1, wherein each of the at least two ports is further adapted to toggle between the non-connected slave state and the non-connected master state.

3. The radio equipment according to claim 1, wherein each of the at least two ports in the non-connected master state is further arranged to send date into the internal network and to listen to a response to the data sent into the internal network, and to change to a connected master state upon detection of the response.

4. The radio equipment according to claim 1, wherein each of the at least two ports that is currently in the connected slave state is further adapted to detect a link loss condition, to determine whether at least one other of the at least two ports of the radio equipment is in the connected slave state, and to change to the non-connected master state for sending data into the internal network and for listening to a response to the data sent into the internal network, if at least one other of the at least two ports of the radio equipment is in the connected slave state.

5. The radio equipment according to claim 1, wherein each of the at least two ports in the connected master state is further adapted to detect a link loss condition, to determine whether a connection can be re-established, and wherein, upon determination that the connection cannot be re-established, the radio equipment is adapted to change any port that is presently in the non-connected slave state to the non-connected master state for starting link setup attempts on the ports in non-connected master state.

6. The radio equipment according to claim 1, wherein each of the at least two ports is configurable to a master state or to a slave state using commands.

7. A computer-program product embodied on a non-transitory computer-readable medium and comprising executable instructions for the manufacture of a radio equipment usable in a base station of a mobile communications network, the radio equipment comprising at least two ports for interfacing with an internal network of the base station, each of the at least two ports being dynamically configurable as a master port or a slave port, wherein each of the at least two ports is configured in a non-connected slave state upon activation, each of the configured at least two ports in non-connected slave state being arranged to listen to communication on the internal network for a time period and to change to a connected slave state upon detection of the communication on the internal network, or to change to a non-connected master state upon expiry of the time period.

8. A method for configuring ports of radio equipments connected to an internal network of a base station of a mobile communications network, the method comprising:
   activating at least one port of the radio equipment to become an activated port,
   changing the activated at least one port to a non-connected slave state in which the activated at least one port listens to a communication on a link of the internal network for a time period,
   upon detection of the communication on the link changing the activated at least one port to a connected slave state, or
   upon expiry of the time period changing the activated at least one port to a non-connected master state in which the activated at least one port actively sends data into the link of the internal network.

9. The method according to claim 8, further comprising toggling the state of the activated at least one port between the non-connected slave state and the non-connected master state until either the communication on the link is detected or a response to data sent into the link is detected.

10. The method according to claim 8, further comprising for each one of the at least one port being in the non-connected master state:
   listening for a response to the data sent into the internal network, and
   changing to a connected master state upon detection of the response.

11. The method according to claim 8, further comprising for each one of the at least one port that is currently in the connected slave state:
   detecting a link loss condition, determining whether at least one other of the at least one port of the radio equipment is in the connected slave state, and if at least one other of the at least one port of the radio equipment is in the connected slave state, then changing to the non-connected master state for sending data into the internal network and for listening to a response to the data sent into the internal network.

12. The method according to claim 8, further comprising for each one of the at least one port in the connected master state:

detecting a link loss condition, determining whether a connection can be re-established, and, upon determination that the connection cannot be re-established, changing any port that is presently not in the connected state to the non-connected master state for starting link setup attempts on the ports in non-connected master state.

13. The method according to claim 8, further comprising configuring one of the at least one port to a master state or a slave state using commands.

14. A method for configuring ports of a radio equipment controller connected to an internal network of a base station of a mobile communications network, the method comprising:

activating a first port of the radio equipment controller, configuring the first port to be in a non-connected master state, and the first port actively sending data into a corresponding link of the internal network, activating a second port of the radio equipment controller, configuring the second port to be in a wait state for a wait time, upon expiry of the wait time the second port listening to communication on a second link to a radio equipment, upon detection of the communication on the second link changing the state of the second port to the non-connected master state and the second port actively sending data into the internal network.

15. The method according to claim 14, further comprising:

receiving status information from the ports of one or more radio equipments, and sending port configuration commands to the one or more radio equipments.

16. A computer-program product comprising instructions embodied on a non-transitory computer-readable medium and that enable a processor to carry out a method for configuring ports of a radio equipment controller connected to an internal network of a base station of a mobile communications network, the method comprising:

activating a first port of the radio equipment controller, configuring the first port to be in a non-connected master state, and the first port actively sending data into a corresponding link of the internal network, activating a second port of the radio equipment controller, configuring the second port to be in a wait state for a wait time, upon expiry of the wait time the second port listening to communication on a second link to a radio equipment, upon detection of the communication on the second link changing the state of the second port to the non-connected master state and the second port actively sending data into the internal network.

* * * * *